US008218497B2

(12) United States Patent
Yu

(10) Patent No.: US 8,218,497 B2
(45) Date of Patent: Jul. 10, 2012

(54) SYNCHRONIZATION IN AN UPLINK SPATIAL DIVISION MULTIPLE ACCESS MODE OF A WIMAX WIRELESS COMMUNICATION SYSTEM

(75) Inventor: Xiaoyong Yu, Grayslake, IL (US)

(73) Assignee: Motorola Mobility, Inc., Libertyville, IL (US)

( * ) Notice: Subject to any disclaimer, the term of this patent is extended or adjusted under 35 U.S.C. 154(b) by 281 days.

(21) Appl. No.: 12/715,632

(22) Filed: Mar. 2, 2010

(65) Prior Publication Data

US 2011/0216734 A1 Sep. 8, 2011

(51) Int. Cl.
*H04W 4/00* (2009.01)
*H04J 4/00* (2006.01)

(52) U.S. Cl. .................. 370/330; 370/436; 370/478

(58) Field of Classification Search .............. 370/329, 370/330, 436, 478
See application file for complete search history.

(56) References Cited

U.S. PATENT DOCUMENTS

2005/0141474 A1 6/2005 Lee et al.
2010/0296438 A1* 11/2010 Yu et al. ............... 370/328

OTHER PUBLICATIONS

Thierry Pollet and Miguel Peeters: "Synchronization with DMT Modulation", IEEE Communications Magazine, Apr. 1999, pp. 80-86.
Timothy M. Schmidl and Donald C. Cox: "Robust Frequency and Timing Synchronization for OFDM", IEEE Transactions on Communications, vol. 454, No. 12, Dec. 1997, pp. 1613-1621.
F. Tufvesson, Mike Faulkner, Peter Hoeher and Ove Edfors: "OFDM Time and Frequency Synchronization by Spread Spectrum Pilot Technique", 8th IEEE Communication Theory Mini Conference, ICC?99, Vancouver, Canada, Jun. 1999, pp. 115-119.
Baoguo Yang et al.: "Timing Recovery for OFDM Transmission", IEEE Journal on Selected Areas in Communications, vol. 18, No. 11, Nov. 2000, pp. 2278-2284.
Uwe Lambrette, Michael Speth and Heinrich Meyr: "OFDM Burst Frequency Synchronization by Single Carrier Training Data", IEEE Communications Letters, vol. 1, No. 2, Mar. 1997, pp.
J.J. van de Beek, M. Sandell, and P.O. Borjesson: "ML Estimation of time and Frequency Offset in OFDM Systems", IEEE Transactions on Signal Processing, vol. 45, No. 7, Jul. 1997, pp. 1800-1805.

* cited by examiner

*Primary Examiner* — Ronald Abelson

(57) ABSTRACT

An apparatus and method for synchronization in an uplink spatial division multiple access (UL SDMA) mode of a WiMAX wireless communication system includes a first step (500) of allocating a mixed sequence of first and second tile patterns for mobile station uplink slots. A next step (502) includes detecting embedded pilot signals in mobile station data traffic. A next step (504) includes calculating first and second pilot signal phase difference within the respective first and second tile patterns. A next step (506) includes estimating a time error and a frequency error of the pilot signals. A next step (508) includes sending information about the time and/or frequency error to the mobile station for use in synchronization (510).

13 Claims, 5 Drawing Sheets

-PRIOR ART-

SYNCHRONIZATION IN AN UPLINK SPATIAL DIVISION MULTIPLE ACCESS MODE OF A WIMAX WIRELESS COMMUNICATION SYSTEM

FIELD OF THE INVENTION

This invention relates to a WiMAX wireless communication system, in particular, to synchronization in an uplink spatial division multiple access (UL SDMA) mode in a WiMAX communication system.

BACKGROUND OF THE INVENTION

The IEEE 802.16 communication standard, or WiMAX, uses an Orthogonal Frequency Division Multiple Access (OFDMA) protocol. In the OFDMA system, a mobile station (MS) is assigned a frequency sub-channel and a time slot in a physical layer for its communications with a base station, node B, or access point (AP). It is important in an OFDMA system to maintain both time and frequency synchronization. If frequency synchronization is lost then orthogonality between the various sub-carriers assigned to other MSs is also lost, which results in interference between MSs. If time error is present, system performance will be degraded due to received signal constellation rotation. Therefore, it is required in WiMAX that individual MSs maintain time and frequency synchronization with an AP to which the MSs are connected. However, synchronization becomes problematic in some WiMAX operational modes, such as uplink spatial division multiple access (UL SDMA) mode for example.

UL SDMA is a mandatory feature of WiMAX that can theoretically double system capacity by having two different subscribers (with single antenna and transmitting independent data streams) share the same time/frequency resource. To facilitate channel estimation at the receiver side, the WiMAX standard has specified pilot structures in a Partial Usage of Subchannels (PUSC) tile, as shown in FIG. 2. This single tile has four pilot structures in each corner. The pilots are well designed such that they are orthogonal from the base station perspective, where a channel estimate for one subscriber can be calculated without interference from the other sharing subscriber. Ordinarily, for this PUSC signal structure, pilot-based timing and frequency errors are estimated by calculation of pilot signal phase ramp across a time dimension (e.g. OFMD symbol index) and a frequency dimension (e.g. tone index) respectively based on embedded pilot signals.

However, in a UL SDMA implementation, two subscribers share the same tile such that each subscriber uses only two pilots at diagonally opposite corners of the tile, while the remaining (null) corners are not used by that subscriber. The data subcarriers are then shared between the subscribers. For example, referring to FIG. 3, one shared subscriber is assigned to use the corner pilots in pattern A, and the other shared subscriber is assigned to use the other corner pilots in pattern B. However, a problem arises in that this pilot structure together with tile hopping in the uplink makes receiver synchronization very difficult because there are only two pilot signals used for frequency and time error estimation, and these pilot signals are not on the same tone or the frequency separation is too large on the same OFDM symbol index. In other words, there are no two pilots on the same tone for frequency error estimate or the frequency separation within one OFDM symbol is too large for a timing error estimation. This inherent limitation of the pilot structure of a PUSC tile limits UL SDMA application, particularly in the case of high velocity of a subscriber, which introduces degradation problems associated with the Doppler shift (frequency error) and timing errors caused by fast moving.

Accordingly, what is needed is a technique to alleviate the degradation that occurs when using the same WiMAX tile pilot structure for all transmitted UL tiles for a subscriber, such as in UL SDMA mode. It would also be of benefit to minimize the effects of Doppler (frequency) and timing errors.

BRIEF DESCRIPTION OF THE DRAWINGS

The invention is pointed out with particularity in the appended claims. However, other features of the invention will become more apparent and the invention will be best understood by referring to the following detailed description in conjunction with the accompanying drawings in which:

Skilled artisans will appreciate that common but well-understood elements that are useful or necessary in a commercially feasible embodiment are typically not depicted or described in order to facilitate a less obstructed view of these various embodiments of the present invention.

DESCRIPTION OF THE PREFERRED EMBODIMENTS

The present invention provides a framework to alleviate the degradation that occurs when the same WiMAX tile pilot structure is used for all transmitted UL tiles for a single user in a UL SDMA mode. In particular, the present invention mixes different tile pilot structures in each user's resource allocation while preserving the orthogonality of the pilots of the two subscribers. In addition, the present invention solves SDMA performance degradation problems associated with Doppler shift and timing errors caused by fast moving.

Figure 1:
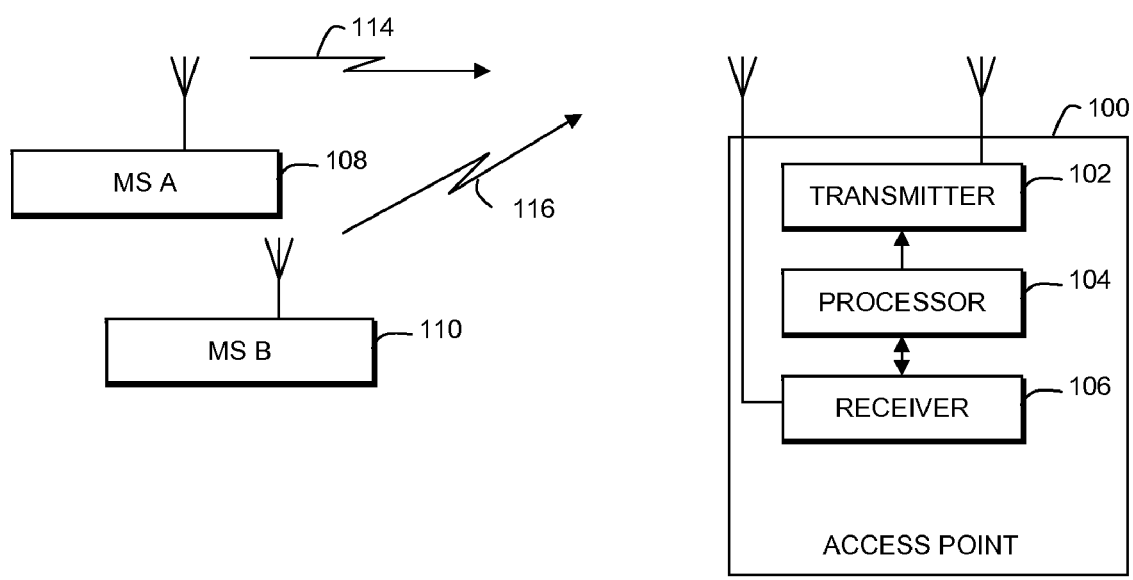
FIG. 1 shows an overview block diagram of a wireless communication system supporting UL SDMA mode, in accordance with the present invention.
Figure 2:
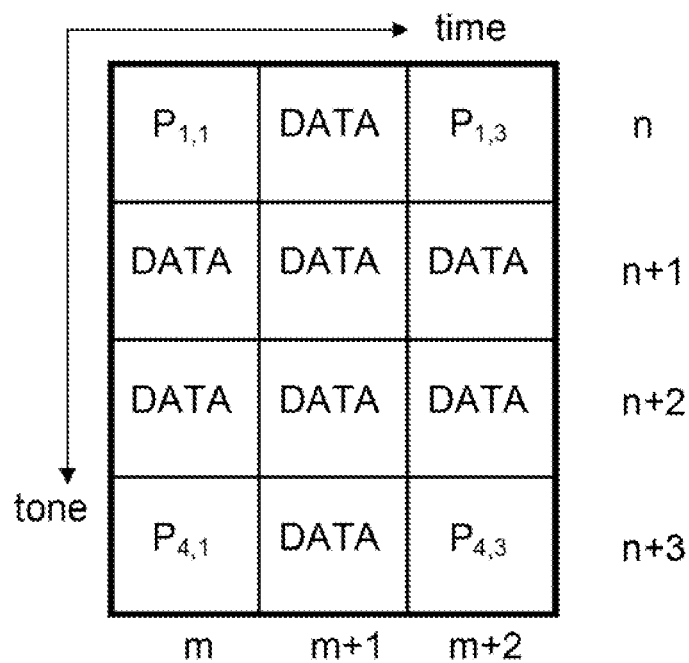
FIG. 2 shows a graphical representation of a PUSC tile pattern, as is known in the art.

FIG. 1 is a block diagram depiction of an OFDMA wireless communication system, such as the IEEE 802.16e or WiMAX system, in accordance with the present invention. At present, standards bodies such as OMA (Open Mobile Alliance), 3GPP (3rd Generation Partnership Project), 3GPP2 (3rd Generation Partnership Project 2) and IEEE (Institute of Electrical and Electronics Engineers) 802 are developing standards specifications for such wireless telecommunications systems. The communication system represents a system operable in a packet data access network that may be based on different wireless technologies. For example, the description that follows will assume that the access network is IEEE 802.XX-based, employing wireless technologies such as IEEE's 802.11, 802.16, or 802.20. Being 802.XX-based, the system is modified to implement embodiments of the present invention.

Referring to FIG. 1, there is shown a block diagram of an access point 100 adapted to support the inventive concepts of the preferred embodiments of the present invention. Those skilled in the art will recognize that FIG. 1 does not depict all of the network equipment necessary for system to operate but only those system components and logical entities particularly relevant to the description of embodiments herein. For example, an access point (AP) or base station can comprise one or more devices such as wireless area network stations (which include access nodes (ANs), AP controllers, and/or switches), base transceiver stations (BTSs), base site controllers (BSCs) (which include selection and distribution units (SDUs)), packet control functions (PCFs), packet control units (PCUs), and/or radio network controllers (RNCs). However, none of these other devices are specifically shown in FIG. 1.

Instead, AP 100 is depicted in FIG. 1 as comprising a processor 104 coupled to a transceiver, such as receiver 106 and transmitter 102. In general, components such as processors and transceivers are well-known. For example, AP processing units are known to comprise basic components such as, but not limited to, microprocessors, microcontrollers, memory devices, application-specific integrated circuits (ASICs), and/or logic circuitry. Such components are typically adapted to implement algorithms and/or protocols that have been expressed using high-level design languages or descriptions, expressed using computer instructions, expressed using messaging flow diagrams, and/or expressed using logic flow diagrams.

Thus, given an algorithm, a logic flow, a messaging/signaling flow, and/or a protocol specification, those skilled in the art are aware of the many design and development techniques available to implement an AP processor that performs the given logic. Therefore, AP 100 represents a known apparatus that has been adapted, in accordance with the description herein, to implement various embodiments of the present invention. Furthermore, those skilled in the art will recognize that aspects of the present invention may be implemented in and across various physical components and none are necessarily limited to single platform implementations. For example, the AP aspect of the present invention may be implemented in any of the devices listed above or distributed across such components. Furthermore, the various components within the AP 100 can be realised in discrete or integrated component form, with an ultimate structure therefore being merely based on general design considerations. It is within the contemplation of the invention that the operating requirements of the present invention can be implemented in software, firmware or hardware, with the function being implemented in a software processor (or a digital signal processor (DSP)) being merely a preferred option.

AP 100 uses a wireless interface for communication with one or more mobile stations, MS A 108, MS B 110. Since, for the purpose of illustration, AP 100 is IEEE 802.16-based, wireless interfaces correspond to a forward link and a reverse link, respectively, with each link comprising a group of IEEE 802.16-based channels and subchannels used in the implementation of various embodiments of the present invention.

Mobile stations (MS) or remote unit platforms are known to refer to a wide variety of consumer electronic platforms such as, but not limited to, mobile nodes, access terminals, user or subscriber equipment, gaming devices, personal computers, and personal digital assistants (PDAs). In particular, each MS 108, 110 comprises a processor coupled to a transceiver, antenna, a keypad, a speaker, a microphone, and a display, as are known in the art and therefore not shown.

Mobile stations are known to comprise basic components such as, but not limited to, microprocessors, digital signal processors (DSPs), microcontrollers, memory devices, application-specific integrated circuits (ASICs), and/or logic circuitry. Such mobile stations are typically adapted to implement algorithms and/or protocols that have been expressed using high-level design languages or descriptions, expressed using computer instructions, expressed using messaging/signaling flow diagrams, and/or expressed using logic flow diagrams. Thus, given an algorithm, a logic flow, a messaging/signaling flow, a call flow, and/or a protocol specification, those skilled in the art are aware of the many design and development techniques available to implement user equipment that performs the given logic.

Each mobile station 108, 110 provides respective uplink signals 114, 116 to the receiver 106 of the AP 100. Each of these uplink signals may present different time delay and frequency errors due to MS environmental changes, mobility, velocity, timing drift, etc. It is well known that high velocity of a MS can result in a large Doppler and timing error, especially when mobile is moving toward or away from AP 100. In the prior art, for all its uplink slots each existing UL SDMA user is assigned one fixed tile pattern that has only two pilots diagonally located in two fixed corners, this makes receiver synchronization extremely difficult, especially in case of subchannel rotation where it is almost impossible to correct the timing error and Doppler based on an individual tile pattern. The present invention seeks to mix the two tile patterns in the uplink slots for each subscriber.

The fundamental idea is to allocate approximately the same number of pattern A and B tiles to each mobile station, via a base station scheduler, and then calculate a timing and frequency error estimate by solving two linear equations. In particular, an AP assigns mixed type A and B tiles (slots) to a UL SDMA subscriber via UL data slot scheduling. The AP receiver then estimates the timing error and Doppler shift in accordance with the present invention based on the proposed tile/slot assignment, and corrects these errors consequently.

For example, in case of a ten slot burst, the prior art tile pattern used for each slot for MS A is the sequence {A, A, A, A, A, A, A, A, A, A}, while the sequence {B, B, B, B, B, B, B, B, B, B} is the tile pattern used for each slot for MS B. In contrast, the present invention mixes the tile pattern between the MSs. For example, in one embodiment a proposed new tile assignment sequence would be {A, A, A, A, A, B, B, B, B, B} for MS A and the complementary sequence {B, B, B, B, B, A, A, A, A, A} for MS B and vice versa. In another embodiment, the possible tile pattern sequence could be (A, B, A, B, A, B, A, B, A, B) for the MS A and (B, A, B, A, B, A, B, A, B, A) for MS B and vice versa. Clearly, these tile assignments have no impact on channel estimation since orthogonality of pilots is preserved, but these novel mixed tile assignments do provide a mechanism for timing and frequency error estimation.

Figure 3:
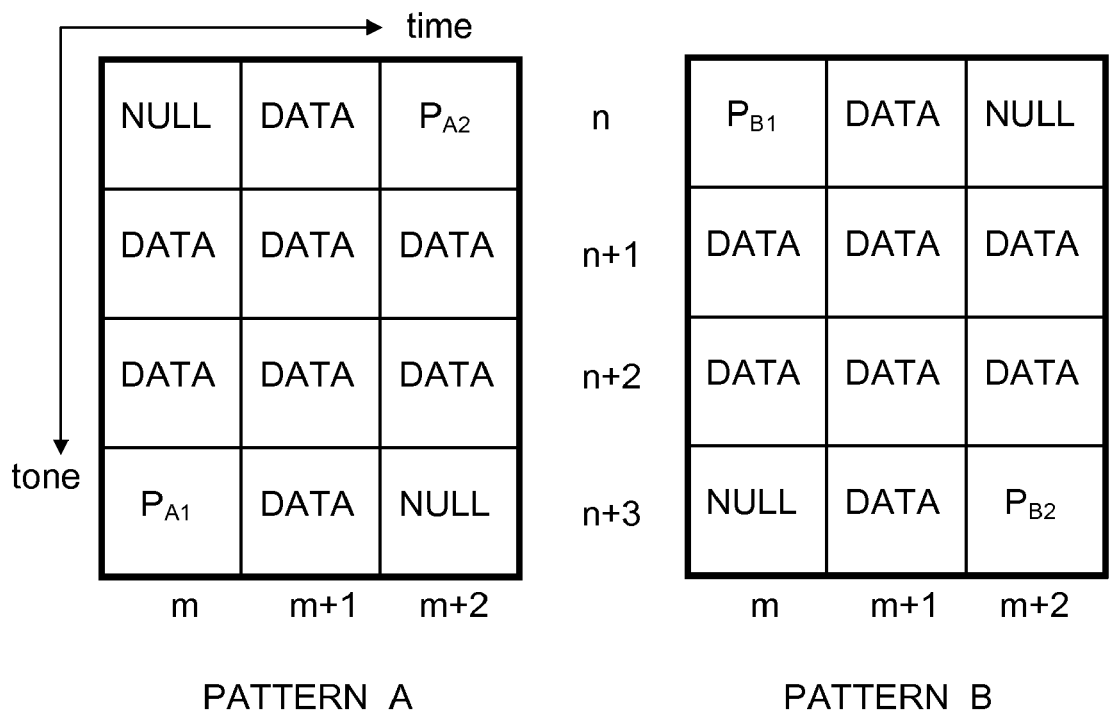
FIG. 3 shows a graphical representation of different tile patterns of pilot and data signals in an UL SDMA mode, in accordance with the present invention.

Timing error and Doppler shift are corrected by data symbol rotation after traditional equalization. The data symbol rotation is proportional to the estimated timing error and Doppler error. It is well-known that timing and frequency errors in an OFDMA system cause received data symbol phase rotation that is tone index dependent and OFDM symbol index dependent, respectively. Timing and frequency error of a subscriber are defined as $\pi$ and $\Delta f$ respectively. Referring to FIG. 3, assuming a tone index and an OFDM symbol index of a tile are $\{n, n+1, n+2, n+3\}$ and $\{m, m+1, m+2\}$ respectively, the phase of the pilot on each corner of a tile can be written as $$\varphi_{n,m}^{(t)} = 2\pi\left(\frac{\tau}{N}n + mT_s\Delta f\right) + \Phi_t,$$

$$\varphi_{n+3,m}^{(t)} = 2\pi\left(\frac{\tau}{N}(n+3) + mT_s\Delta f\right) + \Phi_t$$

$$\varphi_{n,m+2}^{(t)} = 2\pi\left(\frac{\tau}{N}n + (m+2)T_s\Delta f\right) + \Phi_t$$

and $$\varphi_{n+3,m+2}^{(t)} = 2\pi\left(\frac{\tau}{N}(n+3) + (m+2)T_s\Delta f\right) + \Phi_t$$

where t is tile index, N is Fast Fourier Transform (FFT) size of the OFDMA system, $T_s$ is the OFDM symbol interval including cyclic prefix, and $\Phi_t$ is a common phase associated with tile t. For all pattern A tiles of a subscriber, an average of pilot phase difference is calculated as $$\overline{\theta}_A = \overline{\varphi}_{n+3,m} - \overline{\varphi}_{n,m+2} = \frac{6\pi}{N}\overline{\tau} - 4\pi T_s\overline{\Delta f}$$

where $\overline{x}$ indicates the average of x over all pattern A (or B) tiles associated with a subscriber, for instance, $$\overline{\varphi}_{n+3,m} = \frac{1}{T_A}\sum_{t=1}^{T_A}\varphi_{n+3,m}^{(t)}$$

where $T_A$ represents number of pattern A tiles for a user. Similarly, for all pattern B tiles of a user, we have another average of pilot phase difference that is $$\overline{\theta}_B = \overline{\varphi}_{n,m} - \overline{\varphi}_{n+3,m+2} = -\frac{6\pi}{N}\overline{\tau} - 4\pi T_s\overline{\Delta f}$$

Then an estimate of timing error and frequency error for a subscriber can be easily calculated as $$\begin{bmatrix}\overline{\tau}\\ \overline{\Delta f}\end{bmatrix} = \begin{bmatrix}\frac{6\pi}{N} & -4\pi T_s\\ -\frac{6\pi}{N} & -4\pi T_s\end{bmatrix}^{-1}\begin{bmatrix}\overline{\theta}_A\\ \overline{\theta}_B\end{bmatrix}$$

This 2-by-2 matrix is not singular and can be inverted. In practice, this matrix is fixed for a given OFDMA system (fixed N and $T_s$) and can be pre-calculated off-line.

Finally, for timing and frequency error correction, phase rotation is applied to each data symbol according to its relative location in a tile. For example, the data symbol on tone n and OFDMA symbol m+1 of a tile is rotated by the phase $$\phi_{n,m+1} = -2\pi\left(\frac{\overline{\tau}}{N}n + (m+1)T_s\overline{\Delta f}\right)$$

While the tile common phase $\Phi_t$ will be factored in channel estimation and compensated by an equalizer, assuming the channel estimation is computed on a tile basis.

The present invention can be summarized as follows:
a. Assign roughly the same number of pattern A and B tiles to each user via the BS scheduler.
b. Calculate the phase of each pilot in a tile.
c. Calculate phase difference of two pilots at diagonally opposite corners of a tile.

This results in two phase differences corresponding to pattern A and B.
d. Average all pattern A and B phase differences for a user
e. Multiply a constant matrix with the averaged pattern A and B phase difference associated with a user, where the constant matrix is pre-determined that depends on FFT size and symbol interval of the OFDMA system. The resultant values are estimated timing error and frequency error of the user.
f. Rotate data symbols in a tile according to their relative tone index and OFDMA symbol index in the tile and estimated timing error and frequency error.

Example

Test results indicate that conventional UL SDMA performance, using the same tile pilot structure allocation for each subscriber, is very susceptible to synchronization errors (in terms of timing and frequency error that maybe due to Doppler shift) which are inevitable in practice. A typical timing error and overall frequency error for a moving subscriber can be over thirty samples and as large as 3% of tone spacing respectively. Obviously, an UL SDMA receiver without a special synchronization function can not meet performance requirement specified in the existing standards. Specifically, due to the special UL SDMA pilot structure and tile hopping, the existing synchronization technique that is based on phase ramp in both time and frequency dimension is not applicable to a SDMA mode receiver. However, the present invention addresses these problems as described above.

To evaluate the improved performance of an UL SDMA receiver provided by the present invention, simulations have been conducted for a Packet Error Rate (PER) of 16QAM with forty samples of timing error and 3% of tone spacing frequency offset. In the case of a 10 MHz WiMAX system, the 3% of tone spacing frequency offset is equal to 334.6875 Hz and 40 samples correspond to roughly 2.5 microsecond timing error. Two mobiles were multiplexed and transmitted over an air interface channel with the same timing and frequency errors as specified above. Resulting simulated results show a marked improvement in Signal-to-Noise Ratio performance with the new mixed tile pattern pilot structure allocation of the present invention over the cited art.

Figure 4:
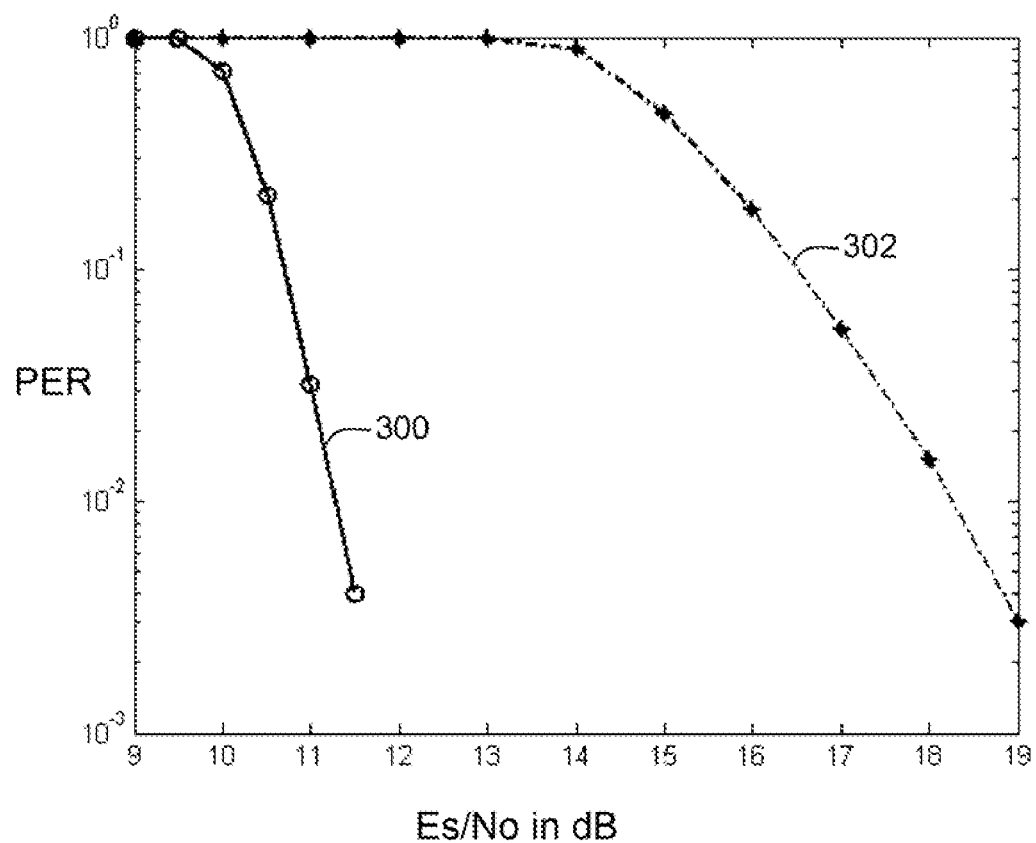
FIG. 4 illustrates simulation results showing a receiver performance improvement in the presence of both timing and frequency errors, in accordance with the present invention.

FIG. 4 shows the simulation results of PER versus Es/No with fifty slots assigned to each of the two mobiles. Curve 302 on the right-hand side represents the packet error rate of a UL SDMA receiver without timing and frequency error correction, while curve 300 on the left-hand side indicates the UL SDMA receiver using the present invention. Based on the results, it can be seen that the proposed technique of the present invention provides a significantly lower PER for a given Es/No over the prior art. Different percentages of tone spacing frequency offsets were also tested, and the simulations all show improved results for the present invention over the prior art. These simulations are not presented here for the sake of brevity.

Figure 5:
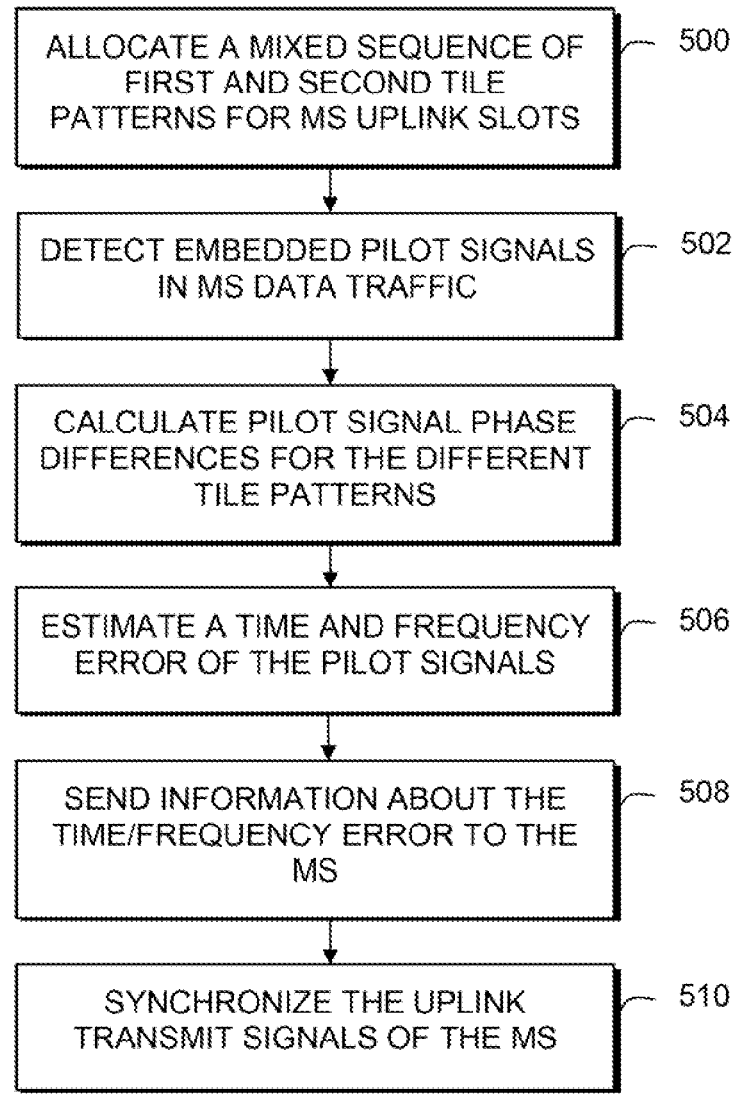
FIG. 5 is a flow chart illustrating a method, in accordance with the present invention.

FIG. 5 shows a flowchart that illustrates a method for synchronization in an uplink spatial division multiple access (UL SDMA) mode of a WiMAX wireless communication system, in accordance with the present invention. A first step 500 includes allocating a mixed sequence of first and second tile patterns for uplink slots of a mobile station. Preferably, substantially the same number of the first and second tile patterns is allocated to the mobile station, such that about half of the allocated patterns are A patterns and half are B patterns.

Where the mobile station is sharing the PUSC tile with another mobile station, a complementary sequence of tile patterns is allocated to each mobile station.

A next step 502 includes detecting embedded pilot signals in mobile station data traffic.

A next step 504 includes calculating a first pilot signal phase difference within the first tile pattern and a second pilot signal phase difference within the second tile pattern. Preferably, the above phase differences are averaged over all uplink slots for a mobile station.

A next step 506 includes estimating a time error and a frequency error of the pilot signals. In practice this is done by multiplying a pre-determined constant matrix with the averaged pilot signal phase difference associated with a mobile station to obtain an estimated timing error and frequency error of the mobile station. The constant matrix is dependent on FFT size and symbol interval of the communication system.

A next step 508 includes sending information about at least one of the time and frequency error to the mobile station.

A next step 510 includes synchronizing the uplink transmit signals of the mobile station in response to at least one of the time error and frequency error. The mobile station modifies its transmitting time instance and carrier frequency accordingly to achieve communication synchronization with base station. Alternatively, if the estimated timing and frequency errors are relatively small, they can be corrected at base station to achieve the synchronization. In this case, synchronizing is performed by data symbol rotation, which is proportional to the estimated timing error and frequency error. Specifically, the data symbols in a tile are rotated according to their relative tone index and OFDMA symbol index in the tile and the estimated timing error and frequency error.

Advantageously, the present invention provides UL SDMA user synchronization based on data traffic and mixed tile assignment. The present invention also provides timing error and Doppler estimation for UL SDMA mode based on the specially assigned tile pattern.

Although the preferred embodiment of the present invention is described with reference to base stations in a WiMAX wireless communication system, it will be appreciated that the inventive concepts hereinbefore described are equally applicable to any OFDMA wireless communication system where synchronization of communication units is an issue.

It will be understood that the terms and expressions used herein have the ordinary meaning as is accorded to such terms and expressions by persons skilled in the field of the invention as set forth above except where specific meanings have otherwise been set forth herein.

The sequences and methods shown and described herein can be carried out in a different order than those described. The particular sequences, functions, and operations depicted in the drawings are merely illustrative of one or more embodiments of the invention, and other implementations will be apparent to those of ordinary skill in the art. The drawings are intended to illustrate various implementations of the invention that can be understood and appropriately carried out by those of ordinary skill in the art. Any arrangement, which is calculated to achieve the same purpose, may be substituted for the specific embodiments shown.

The invention can be implemented in any suitable form including hardware, software, firmware or any combination of these. The invention may optionally be implemented partly as computer software running on one or more data processors and/or digital signal processors. The elements and components of an embodiment of the invention may be physically, functionally and logically implemented in any suitable way. Indeed the functionality may be implemented in a single unit, in a plurality of units or as part of other functional units. As such, the invention may be implemented in a single unit or may be physically and functionally distributed between different units and processors.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term comprising does not exclude the presence of other elements or steps.

Furthermore, although individually listed, a plurality of means, elements or method steps may be implemented by e.g. a single unit or processor. Additionally, although individual features may be included in different claims, these may possibly be advantageously combined, and the inclusion in different claims does not imply that a combination of features is not feasible and/or advantageous. Also the inclusion of a feature in one category of claims does not imply a limitation to this category but rather indicates that the feature is equally applicable to other claim categories as appropriate.

Furthermore, the order of features in the claims do not imply any specific order in which the features must be worked and in particular the order of individual steps in a method claim does not imply that the steps must be performed in this order. Rather, the steps may be performed in any suitable order. In addition, singular references do not exclude a plurality. Thus references to "a", "an", "first", "second" etc do not preclude a plurality.

What is claimed is:

1. A method for synchronization in an uplink spatial division multiple access mode of a WiMAX wireless communication system, the method comprising the steps of:
    allocating a mixed sequence of first and second tile patterns for uplink slots of a mobile station;
    detecting embedded pilot signals in mobile station data traffic;
    calculating a first pilot signal phase difference within the first tile pattern and a second pilot signal phase difference within the second tile pattern;
    estimating a time error and a frequency error of the pilot signals;
    sending information about at least one of the time and frequency error to the mobile station; and
    synchronizing the uplink transmit signals of the mobile station in response to at least one of the time error and frequency error,
    wherein the allocating step includes allocating a complementary sequence of tile patterns to two mobile stations.

2. The method of claim 1 wherein the calculating step includes averaging the pilot signal phase differences for the different tile patterns over all uplink slots for a mobile station.

3. The method of claim 2 wherein the estimating step includes multiplying a pre-determined constant matrix with the averaged pilot signal phase difference associated with a mobile station to obtain an estimated timing error and frequency error of the mobile station.

4. The method of claim 3 wherein the constant matrix is dependent on FFT size and symbol interval of the communication system.

5. The method of claim 1 wherein the synchronizing step include correcting timing and frequency error by data symbol rotation.

6. The method of claim 5 wherein the data symbol rotation is proportional to the estimated timing error and frequency error.

7. The method of claim 1 wherein in the calculating step the phase of the pilot on each corner of a tile is $$\varphi_{n,m}^{(t)} = 2\pi\left(\frac{\tau}{N}n + mT_s\Delta f\right) + \Phi_t,$$

$$\varphi_{n+3,m}^{(t)} = 2\pi\left(\frac{\tau}{N}(n+3) + mT_s\Delta f\right) + \Phi_t$$

$$\varphi_{n,m+2}^{(t)} = 2\pi\left(\frac{\tau}{N}n + (m+2)T_s\Delta f\right) + \Phi_t$$

and $$\varphi_{n+3,m+2}^{(t)} = 2\pi\left(\frac{\tau}{N}(n+3) + (m+2)T_s\Delta f\right) + \Phi_t$$

where the tone index and OFDM symbol index of a tile are $\{n, n+1, n+2, n+3\}$ and $\{m, m+1, m+2\}$ respectively, t is tile index, N is Fast Fourier Transform size of the OFDMA system, $T_s$ is the OFDM symbol interval including cyclic prefix, and $\Phi_t$ is a common phase associated with tile t.

8. The method of claim 7 wherein an average of pilot phase difference is calculated as $$\bar{\theta}_A = \bar{\varphi}_{n+3,m} - \bar{\varphi}_{n,m+2} = \frac{6\pi}{N}\overline{\tau} - 4\pi T_s\overline{\Delta f}.$$

9. The method of claim 7 wherein the average of pilot phase difference for the first pattern is $$\bar{\varphi}_{n+3,m} = \frac{1}{T_A}\sum_{t=1}^{T_A} \varphi_{n+3,m}^{(t)}$$

where $T_A$ represents number of first pattern tiles for the mobile station, and the average of pilot phase difference for the second pattern is $$\bar{\theta}_B = \bar{\varphi}_{n,m} - \bar{\varphi}_{n+3,m+2} = -\frac{6\pi}{N}\overline{\tau} - 4\pi T_s\overline{\Delta f}.$$

10. The method of claim 9 wherein the estimate of timing error and frequency error for the mobile station is $$\begin{bmatrix}\overline{\tau}\\\overline{\Delta f}\end{bmatrix} = \begin{bmatrix}\frac{6\pi}{N} & -4\pi T_s\\-\frac{6\pi}{N} & -4\pi T_s\end{bmatrix}^{-1}\begin{bmatrix}\bar{\theta}_A\\\bar{\theta}_B\end{bmatrix}$$

11. The method of claim 1 wherein the synchronization step applies a phase rotation to each data symbol according to $$\phi_{n,m+1} = -2\pi\left(\frac{\tau}{N}n + (m+1)T_s\overline{\Delta f}\right)$$

where the data symbol is on tone n and OFDMA symbol m+1 of the tile.

12. A mobile station operable for synchronization in an uplink spatial division multiple access mode of a WiMAX wireless communication system, the mobile station comprising:
a transmitter operable to send data traffic;
a receiver operable to receive an allocation of a mixed sequence of first and second tile patterns for uplink slots transmissions and information about a time and/or frequency error from a base station that detects embedded pilot signals in the transmitted data traffic, calculates a first pilot signal phase difference within the first tile pattern and a second pilot signal phase difference within the second tile pattern, and estimates a time and/or frequency error of the pilot signals to be sent to the mobile station; and
a processor coupled to the transmitter and receiver, the processor operable to synchronizing the uplink transmit signals of the mobile station in response to the time and/or frequency error information;
wherein the allocation includes a complementary sequence of tile patterns allocated to two mobile stations.

13. A base station operable to provide synchronization in an uplink spatial division multiple access mode of a WiMAX wireless communication system, the base station comprising:
a receiver operable to receive mobile station data traffic;
a transmitter operable to send an allocation of a mixed sequence of first and second tile patterns for uplink slots transmissions to a mobile station, and send time and/or frequency error information to the mobile station for synchronization; and
a processor coupled to the receiver and transmitter, the processor operable to determine the allocation of the mixed sequence of first and second tile patterns to be sent to the mobile station, detect embedded pilot signals in the transmitted data traffic from the mobile station, calculate a first pilot signal phase difference within the first tile pattern and a second pilot signal phase difference within the second tile pattern, and estimate a time error and a frequency error of the pilot signals to be transmitted to the mobile station;
wherein the allocation includes a complementary sequence of tile patterns allocated to two mobile stations.

* * * * *